A. L. PATTERSON.
FOCUSING ATTACHMENT.
APPLICATION FILED OCT. 19, 1920.

1,397,231.

Patented Nov. 15, 1921.

Inventor,
A. L. Patterson
By C A Snow & Co.
Attorneys.

UNITED STATES PATENT OFFICE.

ARTHUR L. PATTERSON, OF WASHINGTON, DISTRICT OF COLUMBIA.

FOCUSING ATTACHMENT.

1,397,231.  Specification of Letters Patent.  Patented Nov. 15, 1921.

Application filed October 19, 1920. Serial No. 418,072.

*To all whom it may concern:*

Be it known that I, ARTHUR L. PATTERSON, a citizen of the United States, residing at Washington, in the District of Columbia, have invented a new and useful Focusing Attachment, of which the following is a specification.

By way of explanation, it may be stated that, as is well known, one of the fundamental and most important problems confronting a photographer, and particularly an amateur photographer, is the obtaining of a proper focus. Many devices adapted for this purpose have been suggested, and not a few of them are satisfactory, if merely the obtaining of an accurate focus, weighed by itself, is taken into consideration.

There are, however, other elements which enter into the matter, and these have been neglected in some instances. Again, the art has advanced and grown, focusing attachments which were satisfactory at the time of conception, having become obsolete, as a consequence. Thus, it has been suggested that focusing attachments may be built into a camera—but such a construction is not satisfactory at the present time, owing to the fact that it will interfere with an autographic mechanism which is so well known as to require no more than mere mention. Further, compactness must be sought for, and all parts of the focusing attachment must be covered and protected, when not in use.

The foregoing being understood, it may be stated that this invention aims to provide a focusing attachment adapted to be mounted on the side of a camera, without working any changes in the camera, and without interfering with any important parts of the camera, such as the autographic mechanism, the attachment comprising a bellows, so that the image on the focusing screen may be clear and distinct, the bellows and its lens being capable of being folded into a casing, which, in its turn, may be swung against the body of the camera proper, thereby to economize space and to house the bellows and the lens, when the attachment is not in use.

It is within the province of the disclosure, to improve generally and to enhance the utility of devices of that type to which the invention appertains.

Although the drawings show a preferred embodiment of the invention, it is to be understood that a camera maker or mechanic, exercising the skill of his calling, and working within the scope of what is claimed, may make changes in the precise structure depicted and described, without departing from the spirit of the invention.

Figures 1, 2:
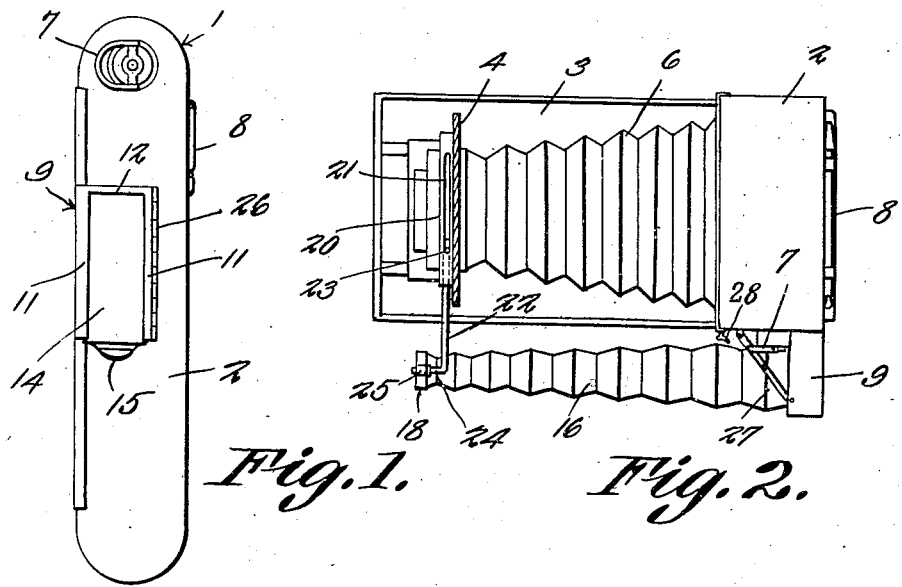
Figures 3, 4:
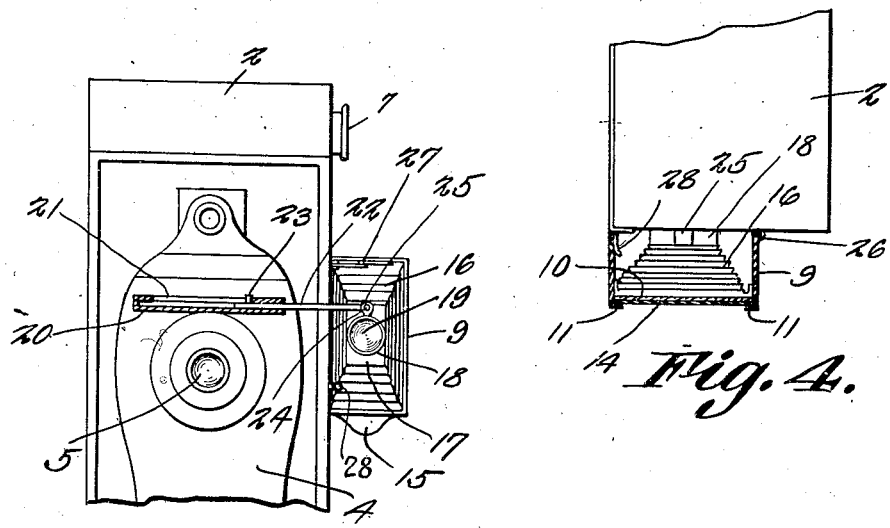

In the drawings:—Figure 1 shows in side elevation, a camera whereunto the device forming the subject matter of this application has been applied; Fig. 2 is a top plan, the camera and the focusing attachment being extended; Fig. 3 is a front elevation showing a camera carrying the attachment, parts being broken away and parts appearing in section; Fig. 4 is a sectional view wherein the attachment is shown collapsed and housed in its casing, the casing being swung against the side of the camera proper.

The device forming the subject matter of this application may be used in connection with cameras of widely different sorts, but by way of illustration, a well known form of camera 1 has been shown, the same including a body 2, to which a platform 3 is hinged for downward and forward swinging movement. A front 4 is slidable on the platform 3, toward and away from the body 2 and is provided with a lens 5, the front constituting, therefore, a lens carrier. A bellows 6 extends between the front 4 and the body 2. The numeral 7 marks the winding key for the film, the autographic attachment appearing at 8. No novelty is claimed for the parts above described, saving in so far as they may enter into combination with parts hereinafter desribed.

The focusing attachment *per se* comprises a box-like casing 9, open at one side and carrying a focusing screen 10. The casing 9 is supplied with guides 11, and with an end stop 12, as shown in Fig. 1. An opaque slide 14 may be inserted within the guides 11, behind the screen 10, the slide having a finger piece 15, and being adapted to engage the stop 12. The rear end of a bellows 16 is secured within the casing 9, the bellows of course coöperating with the focusing screen 10. The bellows 16 carries a front plate 17 provided with a lens ring 18, wherein a lens 19 is mounted. The lens 19 is of the same focal length as the lens 5 of the camera 1, to the end that when a clear image is secured on the screen 10 of the focusing attachment, the operator may be assured that the camera 1 is in focus.

A means is provided whereby the forward end of the bellows 16 of the focusing attachment may be connected to the front 4 of the camera 1, so that when the front 4 is moved toward and away from the body 2, the lens 19 of the focusing attachment will participate in the movement. The aforesaid means may be of any desired sort. Preferably, a tubular guide 20 is attached to the front 4 of the camera 1, the guide having a longitudinal slot 21. A plunger, in the form of a rod 22, is mounted for reciprocation in the guide 20 and has a transverse finger piece 23 slidable in the slot 21. At its outer end, the plunger 22 has a forwardly presented arm 24 adapted to be received closely in an eye 25 on the lens ring 18 of the focusing attachment. The projection 23 has three functions: First, it limits the outward sliding movement of the plunger 22; second, it affords a means whereby the plunger 22 may be slid outwardly; third, it prevents the plunger 22 from rotating, the arm 24 always extending forwardly, so that the eye 25 may be mounted thereon without difficulty.

A hinge 26 connects the casing 9 with the camera body 2. A foldable brace 27 extends between the casing 9 and the body 2. A latch 28 is mounted on the body 2 and is adapted to coöperate with the casing 9 in a way to be pointed out hereinafter.

When the focusing attachment is not in use, the bellows 16 is collapsed, and both the bellows and the lens 19 are housed within the casing 9, the brace 27 being folded within the casing. The casing 9 is swung against the camera body 2, as shown in Fig. 4, the camera body closing the open side of the casing. The casing 9 is held in the position shown and alluded to, by the latch 28. It is obvious that a construction of the sort mentioned promotes compactness. Further, it interferes in no wise with the autographic mechanism 8, nor does it work changes in the standard camera construction, since it is not built into the camera. The device possesses advantages, in that it includes the bellows 16, a clear image being produced on the screen 10, without the use of a head cloth, and without rendering it necessary to shade the screen 10. In this regard, the structure has nothing in common with a device wherein a lens is carried at one side of the camera front 4, a swinging screen being hinged to the body 2, and no bellows being provided. So far as I am advised as to the state of the art, it is new to embody, in a focusing attachment, a lens, a bellows and a screen, the bellows and the lens being capable of being housed in a casing, and the casing being hinged to the side of the camera body, so that the casing may be swung against the body, when the focusing attachment is not in use.

When it is desired to use the attachment, the plunger 22 is slid outwardly by means of the projection 23. The casing 9 is swung outwardly, at right angles to the body 2, and is held in that position by the brace 27. The bellows 16 is extended, the eye 18 is mounted on the arm 24, and when the front 4 of the camera is moved backwardly or forwardly, the lens 19 of the focusing attachment will be moved accordingly, it being possible for the operator to ascertain whether the camera 1 is in focus, by a glance at the screen 10 of the attachment.

The slide 14 preferably is inserted into the guides 11 from that end of the camera which is remote from the winding key 7. This construction is not insisted upon, but it is suggested since, in some cameras, the winding key might possibly interfere with the insertion of the slide, if the slide were inserted in a direction opposite to that alluded to.

I claim:—

1. In a device of the class described, a camera comprising a body; a lens carrier movable toward and away from the body; a box-like casing open at one side; a focusing screen located in the casing; a bellows mounted on the casing and coöperating with the screen; a lens carried by the bellows; means for connecting the forward portion of the bellows detachably to the lens carrier, to effect a shifting of the lens when the lens carrier is shifted; a hinge uniting the casing with the body, whereby the open side of the casing may be swung against the body, the bellows being collapsible to dispose both the bellows and the lens within the casing, between the body of the camera and the screen; and a brace connecting the casing with the body and constituting means for holding the casing in outstanding relation to the body, the brace being foldable to lie within the casing when the casing is swung against the body.

2. In a device of the class described, a camera comprising a body; a lens carrier movable toward and away from the body; a box-like casing open at one side; a focusing screen in the casing; a bellows mounted on the casing and coöperating with the screen; a lens carried by the bellows; means for connecting the forward portion of the bellows detachably to the lens carrier; and means for hinging the casing to the body for folding movement independently of the optical axis of the camera, whereby the open side of the casing may be swung against the body without encumbering the back of the camera.

In testimony that I claim the foregoing as my own, I have hereto affixed my signature in the presence of two witnesses.

ARTHUR L. PATTERSON.

Witnesses:
F. B. WOODEN,
MASON B. LAWTON.